United States Patent
Lutz

(10) Patent No.: US 6,269,938 B1
(45) Date of Patent: Aug. 7, 2001

(54) OVER/UNDER LINE FEED SYSTEM

(76) Inventor: David W. Lutz, 1223 Dickinson Dr., Carlisle, PA (US) 17013

(*) Notice: Subject to any disclaimer, the term of this patent is extended or adjusted under 35 U.S.C. 154(b) by 0 days.

(21) Appl. No.: 09/349,343

(22) Filed: Jul. 8, 1999

Related U.S. Application Data

(60) Provisional application No. 60/092,084, filed on Jul. 8, 1998.

(51) Int. Cl.$^7$ .................................................. B65G 47/44
(52) U.S. Cl. ......................... 198/560; 198/561; 198/589
(58) Field of Search ................... 198/463.3, 560, 198/561, 589, 592, 861.5; 193/35 R, 35 A, 35 SS

(56) References Cited

U.S. PATENT DOCUMENTS

| | | | |
|---|---|---|---|
| 3,251,450 | * | 5/1966 | Ridder .................................. 198/560 |
| 3,388,812 | * | 6/1968 | Looper ............................. 198/560 X |
| 4,977,999 | * | 12/1990 | Smolk ................................ 198/463.3 |

FOREIGN PATENT DOCUMENTS

| | | | | |
|---|---|---|---|---|
| 1153323 | * | 8/1963 | (DE) ..................................... 198/561 |
| 4-352629 | * | 12/1992 | (JP) ..................................... 198/560 |
| 1261857 | * | 10/1986 | (SU) ..................................... 198/561 |

* cited by examiner

Primary Examiner—James R. Bidwell
(74) Attorney, Agent, or Firm—Webb Ziesenheim Logsdon Orkin & Hanson, P.C.

(57) ABSTRACT

An over/under line feed system in accordance with the present invention includes a conveyor assembly positioned adjacent a workstation. The conveyor assembly preferably includes upper and lower conveyors. The workstation includes a workstation support frame and a carriage assembly supported by the workstation support frame. The carriage assembly is configured to receive a container, e.g., a collapsible plastic container, thereon. A lifting device is present to raise and/or lower the carriage assembly between the upper and lower conveyors. A tilting device allows at least a portion of the carriage assembly to tilt, providing easier access to the inside of the container.

22 Claims, 15 Drawing Sheets

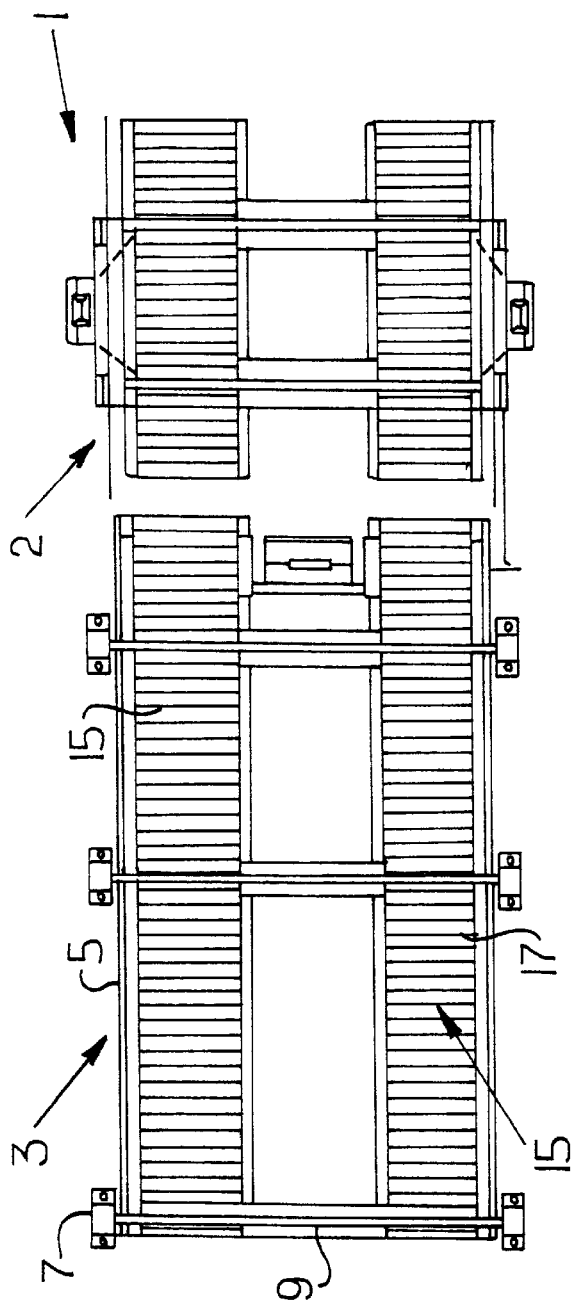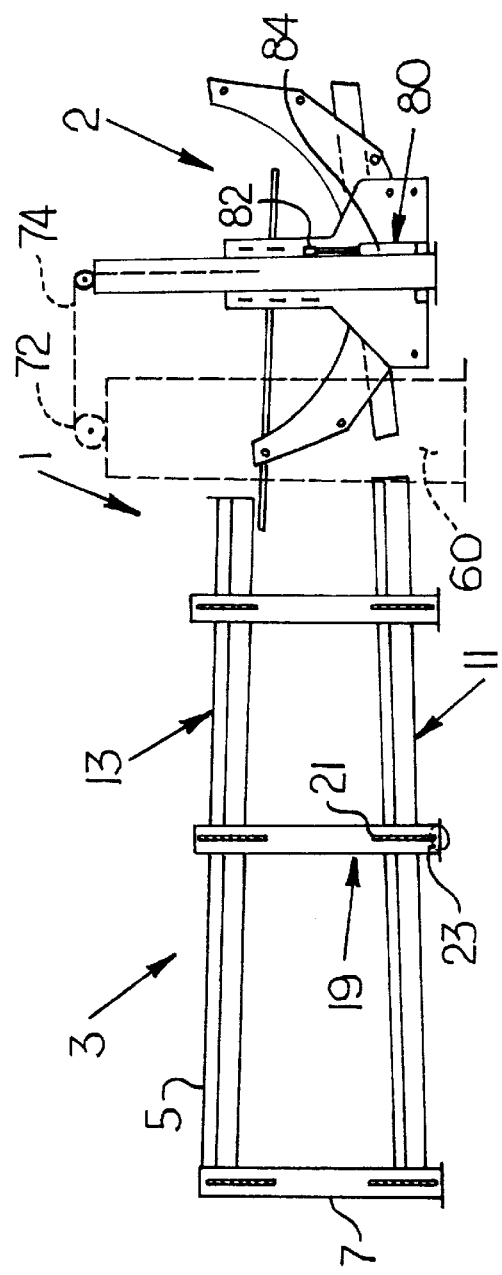
Fig. 1
Fig. 2

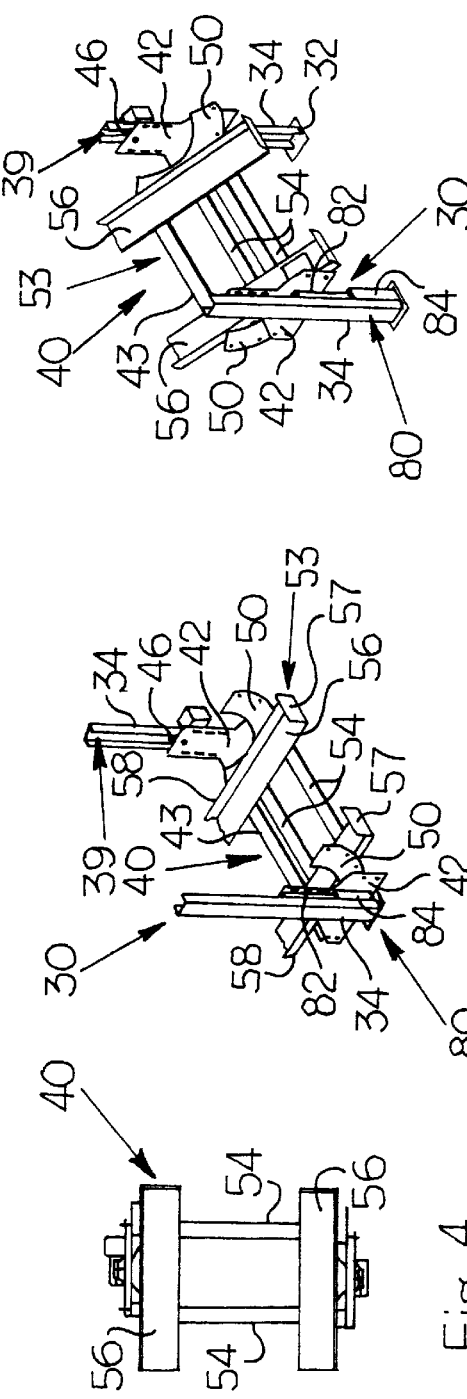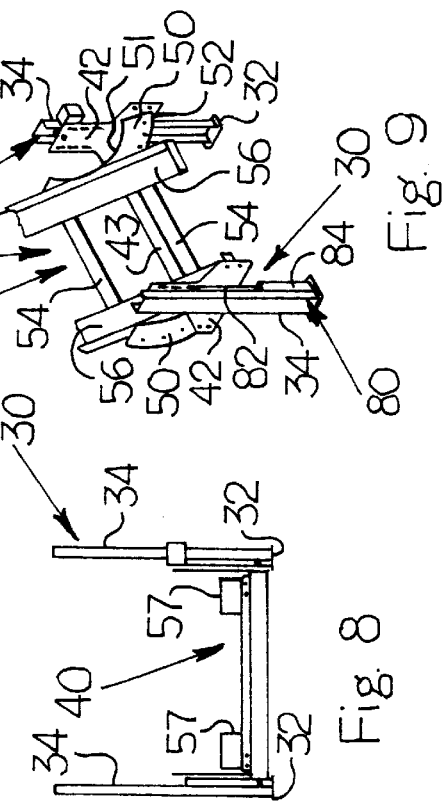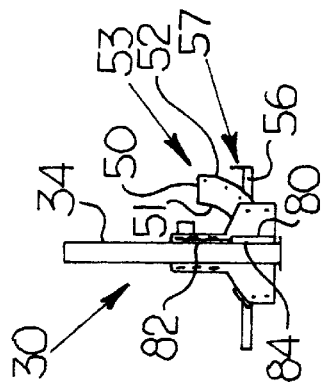

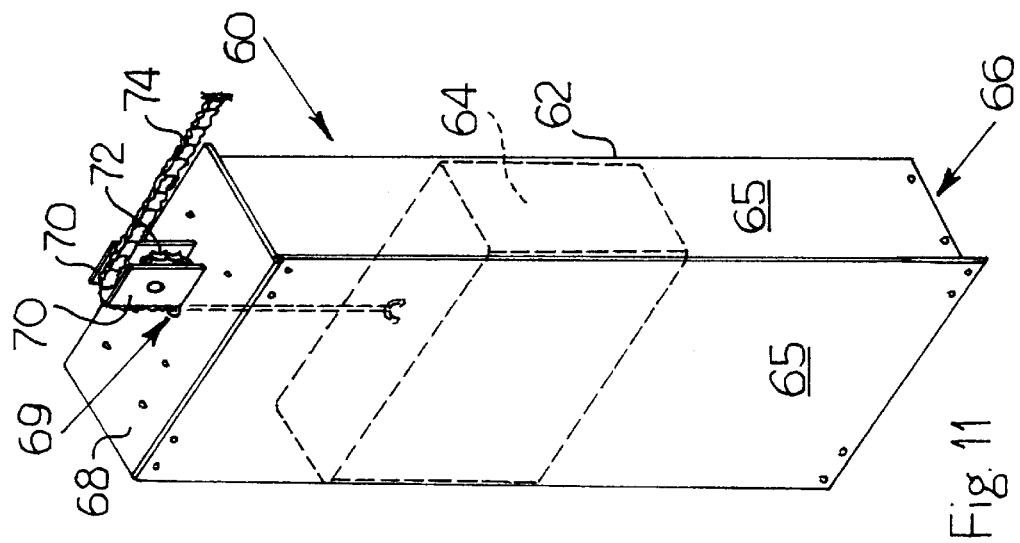
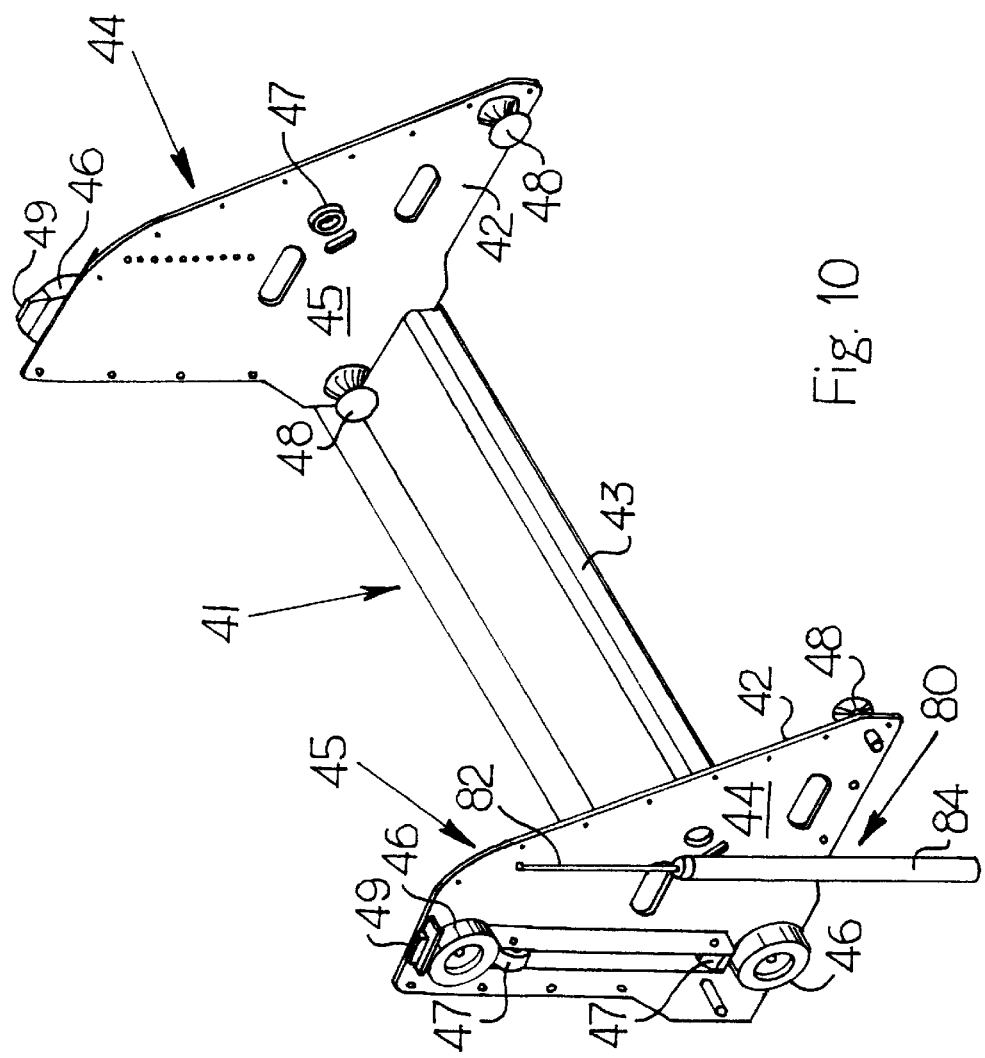

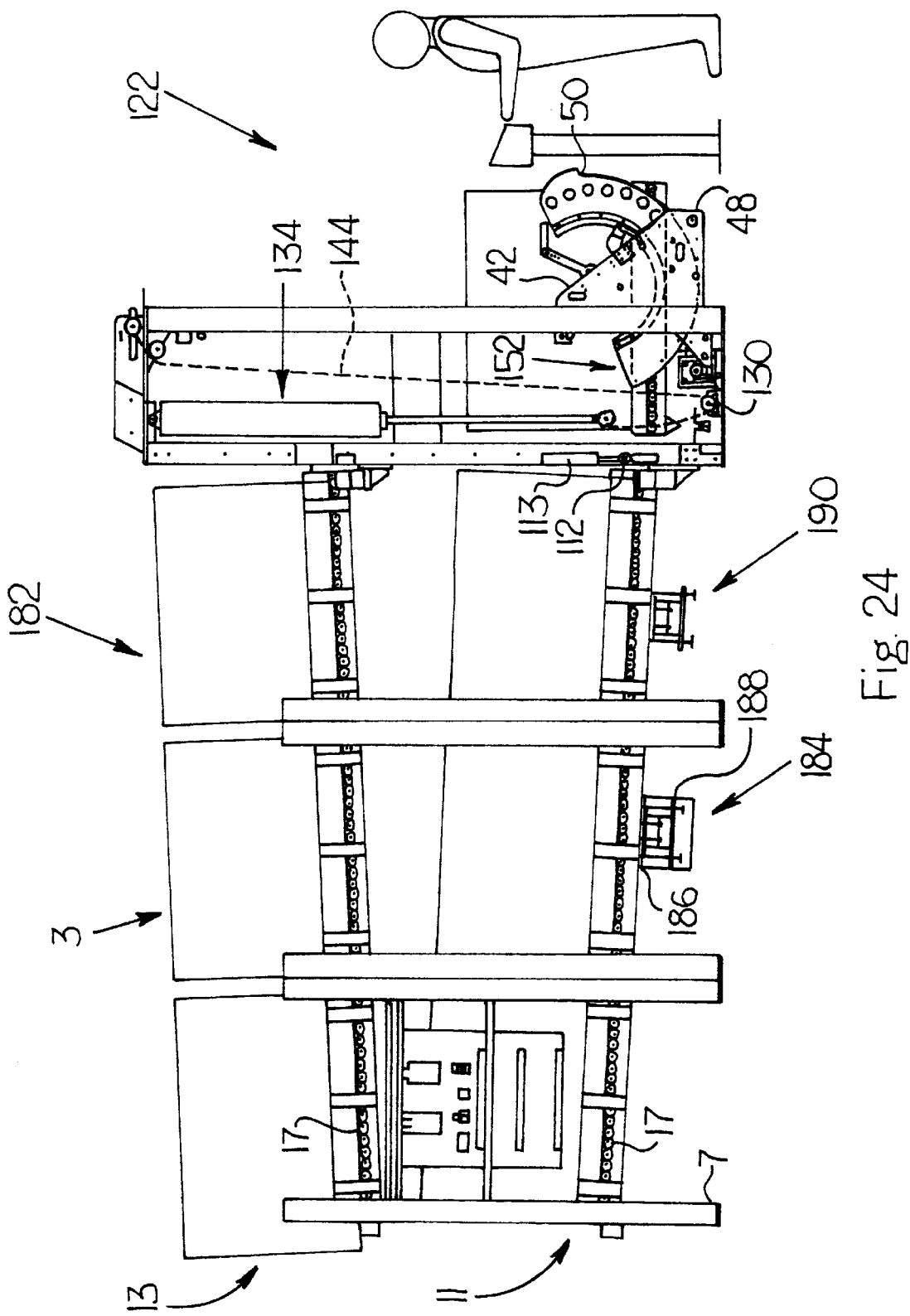

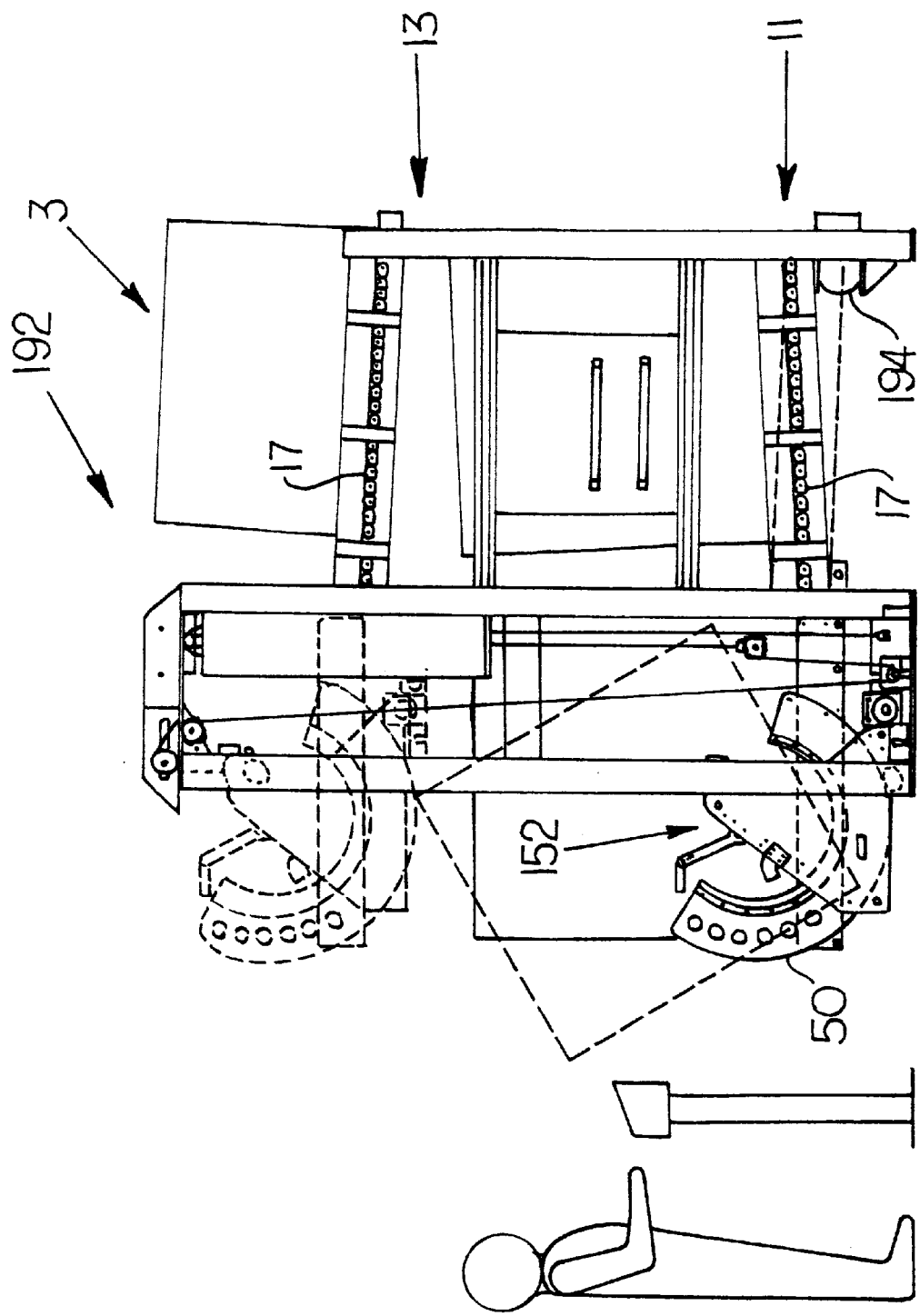

OVER/UNDER LINE FEED SYSTEM

CROSS-REFERENCE TO RELATED APPLICATION

This application claims the benefits of U.S. Provisional application Ser. No. 60/092,084 filed Jul. 8, 1998, which is herein incorporated by reference.

BACKGROUND OF THE INVENTION

1. Field of the Invention

The present invention relates generally to conveyor systems and, more particularly, to gravity and powered over/under line feed systems for handling containers, and in particular, collapsible plastic containers.

2. Description of the Currently Available Technology

An ongoing need in industrial applications which utilize a production line is to provide an efficient and inexpensive way of delivering parts to the production line. Production lines, as for example in the automobile industry, require a large number of individual parts to be delivered to the line. Automated over/under line feed systems have been developed to maximize assembly line parts handling efficiency. These automated over/under line feed systems provide an uninterrupted flow of parts carried in containers or racks. The exact dimensions of the over/under line feed system depend on the size and quantity of the parts to be carried. The individual workers on the line must take each part from the delivered container or rack and install it in the work product in progress, as for example, a car.

An over/under line feed system generally includes a lower conveyor positioned below an upper conveyor. An elevator may be located at one end of the line feed system and defines a workstation for the line feed system operator. Controls are typically located at the operator workstation to control operation of the line feed system, such as conveyor speed, elevator position, etc. However, in general, known over/under line feed systems do not provide adequate workstations for current state-of-the-art container configurations, as for example collapsible plastic containers. Known over/under line feed systems typically provide workstations which move only between the upper and lower conveyors, making the containers difficult to access by the operator. One solution to this problem has been the use of powered tilt tables which can mechanically deliver parts carrying containers to the production line and return them to the parts supply area. However, these devices are awkward to use because they invade the work space of the operator.

A need exists to provide an over/under line feed system for handling containers and, in particular, collapsible plastic containers, which can be utilized to efficiently deliver production parts to a production line. Therefore, it is an object of the present invention to provide a workstation with a carriage assembly which is movable between a raised position and a lowered position and which can tilt forwards and backwards relative to the operator of the workstation without significantly invading the work space of the operator of the workstation.

SUMMARY OF THE INVENTION

An over/under line feed system in accordance with the present invention includes a conveyor or conveyor assembly positioned adjacent a workstation. The conveyor assembly preferably includes upper and lower conveyors. The workstation includes a workstation support frame and a carriage assembly supported by the workstation support frame. The carriage assembly is configured to receive a container, e.g. a collapsible plastic container, thereon. A lifting device is present to raise and/or lower the carriage assembly between the upper and lower conveyors. A tilting device allows at least a portion of the carriage assembly to tilt without unduly invading the work space of the operator, providing the operator easier access to the inside of the container. In one embodiment, the lifting device includes a counterweight assembly positioned adjacent the workstation support frame. The counterweight assembly provides a biasing or restraining force to maintain the carriage assembly in a raised position when a container is not positioned on the carriage assembly. A piston-cylinder assembly may be connected between the workstation support frame and the carriage assembly and may be connected to an incompressible fluid source by a shutoff valve. In a powered embodiment, the counterweight assembly can be replaced by a conventional lifting assembly, such as an electric motor, hydraulic or pneumatic cylinder, air bag, ball screw, etc.

BRIEF DESCRIPTION OF THE DRAWINGS

A complete understanding of the invention will be obtained from the following description when taken in conjunction with the accompanying drawing figures wherein like reference symbols identify like parts throughout.

FIG. 1 is a plan view of an over/under gravity line feed system incorporating features of the invention;

FIG. 2 is a side view of the system of FIG. 1;

FIG. 4 is a schematic plan view of a workstation in accordance with the invention;

FIG. 5 is a top perspective view of the workstation of FIG. 4 showing a carriage assembly in a lowered position;

FIG. 6 is a top perspective view of the workstation of FIG. 5 showing the carriage assembly in a raised and tilted position;

FIG. 7 is a side view of the workstation of FIG. 5;

FIG. 8 is a front view of the workstation of FIG. 5;

FIG. 9 is a top perspective view of the workstation of FIG. 6 showing the workstation in a tilted position;

FIG. 10 is a top perspective view of a bearing plate assembly of the invention;

FIG. 11 is a perspective view of a counterweight assembly in accordance with the invention;

FIG. 24 is a side view of an alternative line feed system of the invention;

FIG. 25 is a further embodiment of a line feed system of the invention; and

DESCRIPTION OF THE PREFERRED EMBODIMENTS

Figure 3:
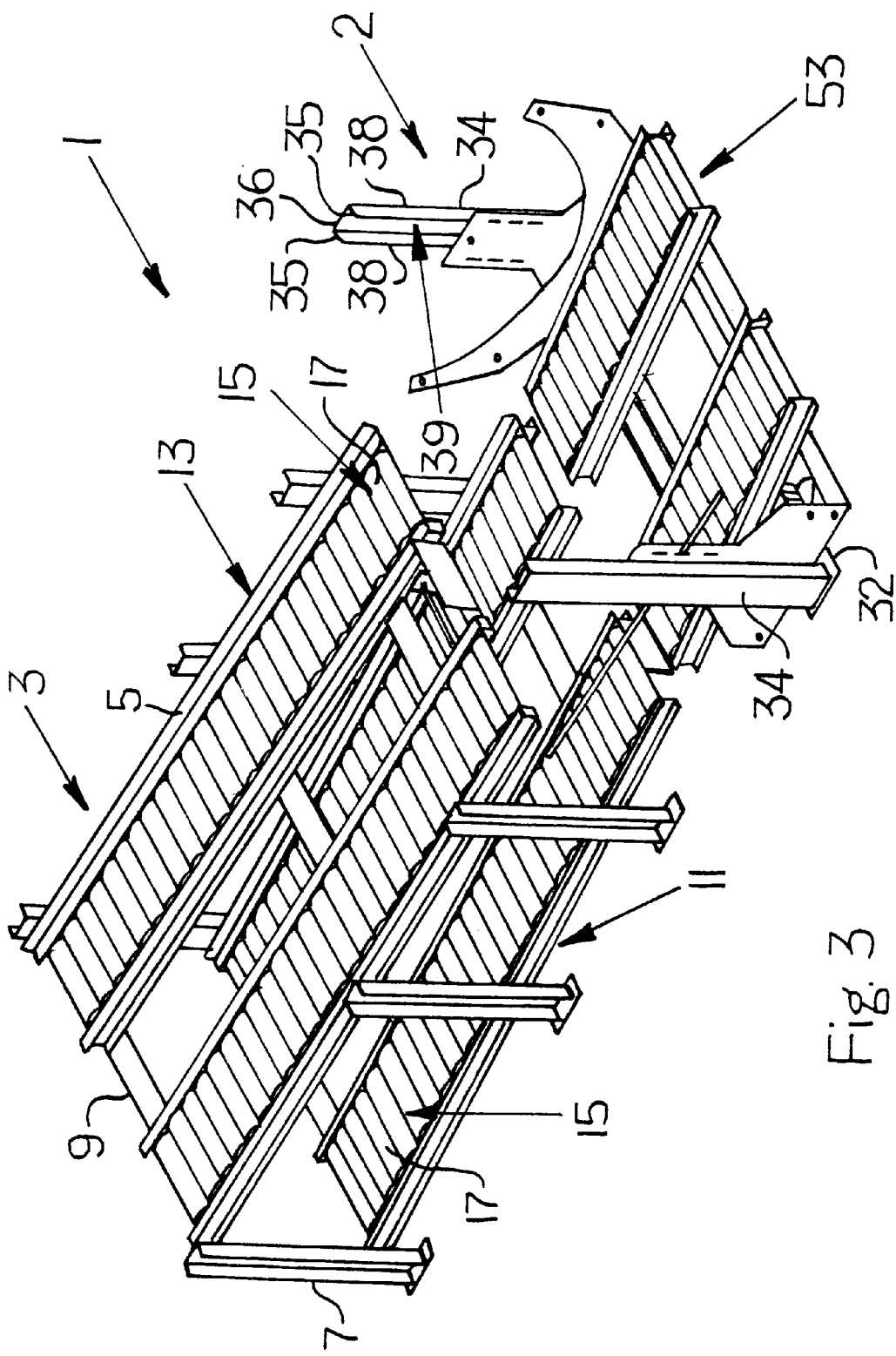
FIG. 3 is a top perspective view of the system of FIG. 1.

For purposes of the description hereinafter, the terms "upper", "lower", "right", "left", "top", "bottom", "front", "rear" and similar directional terms shall relate to the invention as it is oriented in the drawing figures. The term "front" is generally used to refer to the side closest to the operator. However, it is to be understood that the invention may assume various alternative variations and step sequences, except where expressly stated to the contrary. It is also to be understood that the specific devices and processes illustrated in the attached drawings and described in the following specification are simply exemplary embodiments of the invention. Hence, specific dimensions and other physical characteristics related to the embodiments described herein are not to be considered as limiting.

The present invention relates to both a gravity line feed system, i.e. in which the carriage assembly is moved under the force of gravity, and a powered line feed system, i.e. in which the carriage assembly is moved by a powered lifting means, such as a lifting cylinder, electric motor, etc. The gravity line feed system will be discussed first.

An over/under gravity line feed system 1 in accordance with the invention is generally shown in FIGS. 1–3. The over/under gravity line feed system 1 includes a workstation 2 positioned adjacent a conveyor assembly 3.

The conveyor assembly 3 includes a substantially rectangular and rigid metal framework 5. The framework 5 includes a plurality of spaced apart and substantially vertical support legs 7 and a plurality of cross members 9, spaced apart at substantially regular intervals along the longitudinal length of the framework 5. The conveyor or conveyor assembly 3 is further subdivided into a lower conveyor assembly 11 and an upper conveyor or conveyor assembly 13, both supported by the framework 5. The conveyors are preferably gravity conveyors, e.g., sloped toward or away from the workstation 2, so that the containers thereon move under the influence of gravity along the conveyors. Each of the conveyor assemblies 11 and 13 include at least one conveyor track 15 having a plurality of rollers 17 allowing for slidable movement of a container along the conveyor tracks 15.

A wheel assembly 19 may be attached to each vertical support leg 7, as shown, for example, in FIG. 2. The wheel assembly 19 includes an extendable rod 21 having a wheel 23 positioned at the lower end of the rod 21. The rod 21 is extendable between a lowered position in which the wheel 23 is in contact with the ground and a retracted position in which the wheel 23 is spaced above the ground, much like a trailer hitch lifting jack. The wheel assemblies 19, with each of the rods 21 in the extended position and the wheels 23 in contact with the ground, lift the framework 5 off the ground. The wheel assemblies 19 therefore permit the conveyor assembly 3 to be movable between different fixed workstations 2. The wheel assemblies 19 may be removably attached to the vertical support legs 7 in conventional manner, e.g. by a removable pin (not shown).

Figure 12:
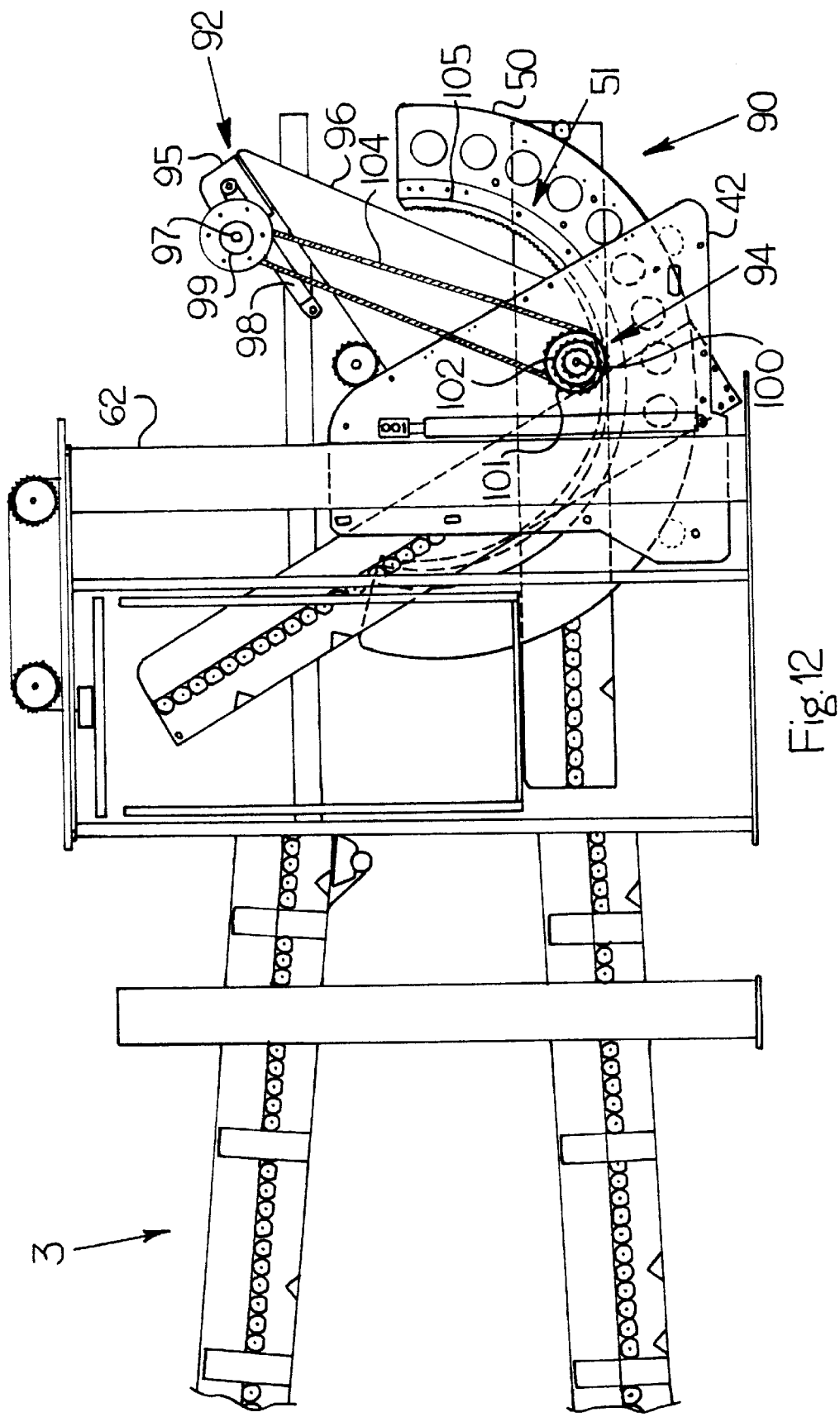
FIG. 12 is a side, broken view. of a workstation of the present invention showing a tilt-control assembly made in accordance with the present invention.

As shown in FIGS. 2–9, the workstation 2 generally includes a workstation support frame 30 and a movable carriage assembly 40 supported by the workstation support frame 30. A counterweight assembly 60, as shown in FIGS. 11 and 12 and in phantom in FIG. 2, is positioned adjacent the workstation support frame 30 in a manually operated embodiment of the present invention, as will be discussed in more detail hereinafter. A piston-cylinder assembly 80, as shown in FIGS. 4–10, is connected between the workstation support frame 30 and the carriage assembly 40. A tilt-control assembly 90, as shown in FIG. 12, is mounted on the workstation support assembly 30.

Referring to FIGS. 3–5, the workstation support frame 30 will now be discussed. The workstation support frame 30 includes two base plates 32 each having a substantially U-shaped channel 34 extending substantially vertically therefrom. The U-shaped channels 34 are spaced apart substantially the width of the conveyor assembly 3. The U-shaped channels 34 are positioned substantially parallel to one another and include an inner wall 36 defined between two flange walls 38, particularly as shown in FIG. 3. The inner walls 36 of the U-shaped channels 34 face one another and may include V-shaped projections 35 on which V-shaped rollers of the carriage assembly 40 ride. The flange walls 38 define a longitudinally extending and substantially vertical slot 39 therebetween.

Referring to FIGS. 4–10, the carriage assembly 40 will now be discussed. As shown in FIG. 10, the carriage assembly 40 includes a bearing plate assembly 41 having two elongated bearing plate members 42 connected by a cross member 43. The bearing plate members 42 each have a first side or outer side 44 and a second side or inner side 45. Each of the bearing plate members 42 include a first pair of guide rollers 46 longitudinally spaced apart on the outer side 44 of each of the bearing plate members 42. The first guide rollers 46 are configured to be rotatably received in the slots 39 defined by the U-shaped channels 34. The guide rollers 46 may have V-shaped grooves to engage the V-shaped projections 35 in the channels 34. Each of the bearing plate members 42 may include a second pair of guide rollers 47 longitudinally spaced apart on the outer side 44 of each of the bearing plate members 42. Each of the second guide rollers 47 is positioned adjacent one of the first guide rollers 46. The second guide rollers 47 rotate about an axis substantially transverse to the axis of rotation of the first guide rollers 46. The bearing plate members 42 further include a roller 47 located above two spaced apart V-groove rollers 48 positioned on the inner side 45 of each of the bearing plate members 42 and above the cross member 43. The V-groove rollers 48 may be rotatably secured to each bearing plate member 42. The bearing plate members 42 also each have a connection tab 49 formed along the top edge.

Referring to FIGS. 4–9, the carriage assembly 40 further includes a work platform 53 tiltably mounted on the bearing plate assembly 41. The work platform has two substantially curved or arcuate substantially C-shaped plate members 50 having a first curved edge 51 and a second curved edge 52. The second curved edge 52 of each of the C-shaped plate members 50 is received in the V-groove defined by the V-groove rollers 48 and the first curved edge 51 contacts the roller 47, permitting substantially curved or arcuate motion of the C-shaped plate members 50 relative to the bearing plate members 42. The C-shaped plate members 50 may also be pivotally connected to the bearing plate members 42, for example by a rod or bar, so that the C-shaped plate members 50 move in the substantially arcuate motion relative to the bearing plate members 42. The C-shaped plate members 50 have cross members 54 extending therebetween. The cross members 54 have conveyor track support members 56 attached thereto. The conveyor track support members 56 are arranged substantially transverse to the cross members 54 and include rollers 17, shown in FIG. 3. The conveyor track support members 56 each include an end flange 57 and may include a side flange 58.

Referring to FIG. 11, the counterweight assembly 60 will now be discussed. At least one counterweight assembly 60 is positioned adjacent the workstation support frame 30 and, in particular, adjacent at least one of the U-shaped channels 34 of the workstation support frame 30 in the manually operated embodiment of the invention. The counterweight assembly 60 generally includes a stanchion 62 housing a counterweight 64 such as a plurality of stacked metal plates. The stanchion 62 is a rectangular-shaped hollow box having four side walls 65 and two end walls 66, 68. The stanchion 62 is preferably positioned adjacent one of the U-shaped channels 34 of the workstation support frame 30 and may be affixed thereto. The stanchion end wall 68 includes an opening 69. The stanchion 62 further includes two flange members 70 extending from the end wall 68. The two flange members 70 have a sprocket 72 rotatably mounted therebetween. The sprocket 72 may also be a pulley, gear or any other similar device. The counterweight 64 housed within the stanchion 62 is connected by a flexible member, such as a chain 74, to at least one of the bearing plate members 42 at the connection tab 49. The chain 74 is received over the sprocket 72 and over a similar sprocket attached to the support frame 30, as shown in phantom in FIG. 2. The chain 74 and sprocket 72 can be replaced by a rope and pulley arrangement, or any other similar configuration in which the counterweight 64 is connected to at least one of the bearing plate members 42. The counterweight 64 in the preferred embodiment weighs about 110% of the weight of the carriage assembly 40. It is envisioned that two counterweight assemblies 60 are provided in the preferred embodiment, each connected to one of the bearing plate members 42 of the carriage assembly 40 at each side of the workstation support frame 30. In a powered embodiment of the invention, the counterweight assembly 60 may be replaced by a conventional lifting assembly, such as an electric motor, hydraulic or pneumatic cylinder, air bag, ball screw assembly, etc. to raise and lower the carriage assembly 40, as will be described hereinbelow.

Referring to FIGS. 4–10, the piston-cylinder assembly 80 will now be discussed. The piston-cylinder assembly 80 generally includes a piston rod 82 having one end received within a cylinder 84. The piston rod 82 has the other end attached to the outer side 44 of one of the bearing plate members 42. The cylinder 84 is preferably attached to the U-shaped channel 34 of the workstation support frame 30. The piston-cylinder assembly 80 can also be freestanding as long as the piston rod 82 is connected to the bearing plate member 42. The cylinder 84 may be in fluid communication with a hydraulic fluid source (not shown), or any other similar incompressible fluid. Alternatively, the piston-cylinder assembly 80 can also be a conventional pneumatic system. Thus, the cylinder 84 can also be in fluid communication with a compressed air source such as an air compressor. A shutoff valve (not shown) is provided between the cylinder 84 and the fluid source. The shutoff valve may be positioned on the U-shaped channel 34 of the workstation support assembly 30 or at any other convenient and accessible location for the operator of the workstation 2. It is envisioned that two piston-cylinder assemblies 80 can be provided on the workstation 2, with one piston-cylinder assembly 80 attached to each side of the carriage assembly 40. Rather than being connected to a compressed fluid source, the piston cylinder assemblies 80 can also simply be conventional pneumatic cylinder assemblies in fluid communication with the ambient air through a cylinder valve.

Referring to FIG. 12, the tilt-control assembly 90 will now be discussed. The tilt-control assembly 90 includes a crank handle gear assembly 92 and a carriage gear assembly 94. The crank handle gear assembly 92 is mounted to a first mounting bracket member 95. The first mounting bracket member 95 is mounted to a second mounting bracket member 96. The second mounting bracket member 96 may be mounted to the bearing plate member 42. The second mounting bracket 96 may also be mounted to one of the U-shaped channels 34 of the workstation support frame 30. The crank handle gear assembly 92 includes a first shaft 97 rotatably mounted on the first mounting bracket member 95. The first shaft 97 has a ratcheting crank handle 98 at one end and a crank handle gear 99 at the other end. The carriage gear assembly 94 is mounted to the bearing plate member 42. The carriage gear assembly 94 may have a second shaft 100 rotatably mounted to the bearing plate member 42. The carriage gear assembly 94 further includes two gears, a first gear 101 and a second gear 102, both mounted on the rotatable second shaft 100. The first gear 101 is connected by a chain 104 to the crank handle gear 99. The second gear 102 engages a gear rack 105 mounted to the first curved edge 51 of one of the C-shaped plate member 50.

Figure 13:
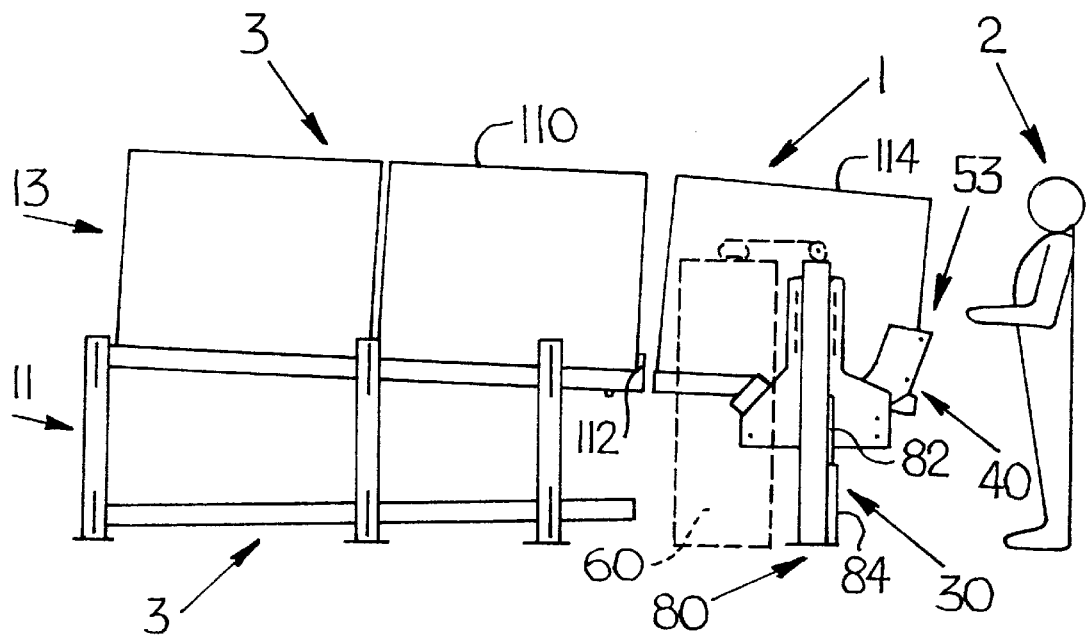
FIG. 13 is a side view of the system of FIG. 1 with the container received on the carriage assembly in a raised position.

Referring to FIGS. 13–17, operation of the over/under gravity line feed system 1 will now be discussed. As shown in FIG. 13, one or more containers 110, preferably collapsible plastic containers as are well-known in the art, are received on the upper conveyor assembly 13. A stop 112, such as a metal piece or bar, movable or pivotable from an upper position extending above the top of the upper conveyor tracks 15 to a lower position below the conveyor tracks 15 is located at the forward end of the upper conveyor assembly 13 adjacent the workstation 2. The stop 112 prevents the containers 110 from moving into the workstation 2. In a preferred embodiment, the stop 112 is operable by the operator of the workstation 2 thereby allowing for the controlled movement of the containers 110 onto the workstation 2. The stop 112 may be manually operated, e.g. by a lever (not shown) or other similar device.

With the carriage assembly 40 in the raised position and the work platform 53 tilted such that the work platform 53 and the upper conveyor 13 lie substantially in the same plane, the stop 112 is lowered and a first container 114 rolls onto the work platform 53 of the carriage assembly 40 at the workstation 2. The stop 112 is then raised to prevent the next container moving forward. The carriage assembly 40 and the container 114 together weigh more than the counterweight 64 (not shown) connected to the carriage assembly 40. The counterweight 64 provides a restraining force which maintains the carriage assembly 40 in the raised position when a container is not positioned on the carriage assembly 40. In the raised position, the container 114 is received on the carriage assembly 40 and moves forward until it contacts the end flanges 57. The shutoff valve (not shown) between the hydraulic fluid source for a hydraulic system or the ambient air for a pneumatic system and the cylinder 84 is in a closed position thereby preventing hydraulic fluid or air from exiting the cylinder 84. The piston-cylinder assembly 80 is therefore in hydraulic or pneumatic lock and the fluid within the cylinder 84 supports the carriage assembly 40 in the raised position with the container 114 positioned thereon. The carriage assembly 40 and the container 114 are thereby prevented from lowering to a lowered position. Since the container 114 and the carriage assembly 40 weigh more than the counterweight 64 connected to the carriage assembly 40, the carriage assembly 40 would lower to the lowered position under the force of gravity if the shutoff valve to the hydraulic fluid source or ambient air were open because the restraining force provided by the counterweight 64 would be insufficient to maintain the carriage assembly 40 in the raised position. The fluid in the cylinder 84 would be forced out of the cylinder 84 under the pressure exerted by the carriage assembly 40 and the container 114 on the piston rod 82 of the piston-cylinder assembly 80.

Figure 14:
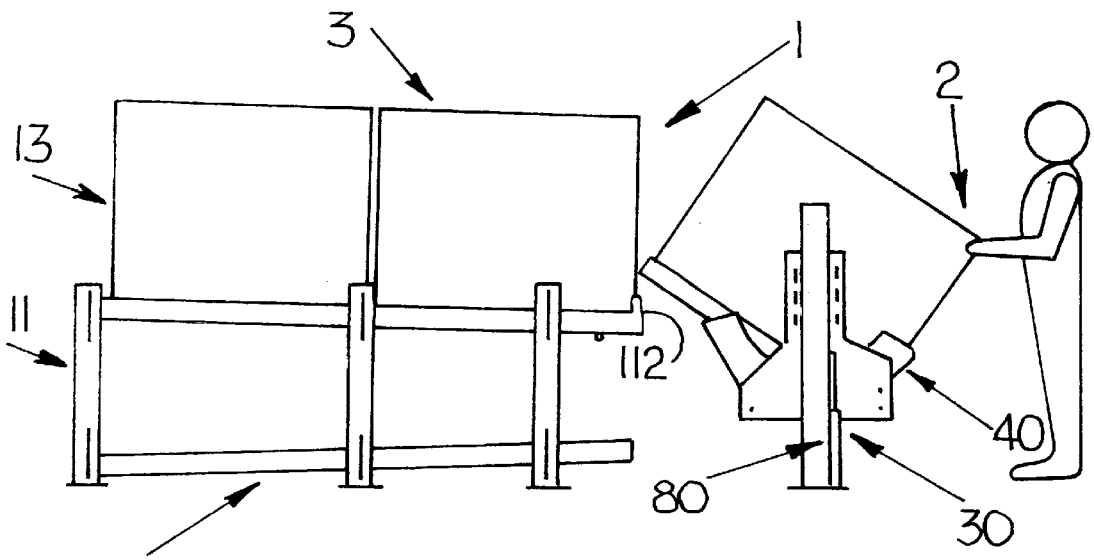
FIG. 14 is a schematic view of the system of FIG. 13 with the carriage assembly in a tilted position.
Figure 15:
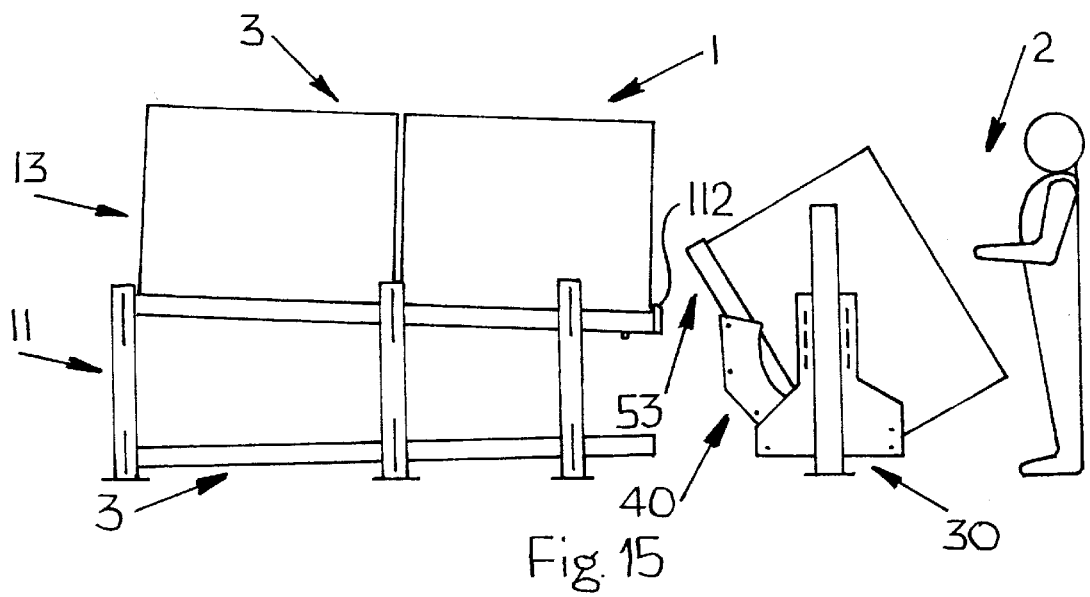
FIG. 15 is a schematic view of the system of FIG. 14 with the carriage assembly in the lowered position.

The carriage assembly 40, as shown in FIGS. 14 and 15, may be tilted forward relative to the workstation support frame 30 by the tilt-control assembly 90 (not shown) so that the contents of the container 114 are easily accessible to the operator of the workstation 2 without invading the work space of the operator. The operator of the workstation 2 can change the tilt angle of the carriage assembly 40 from a neutral tilt or substantially horizontal configuration shown in FIG. 13 by rotating the crank handle 98 of the tilt-control assembly 90 shown in FIG. 12. The crank handle 98 rotates the crank handle gear 99 connected by the chain 104 to the first gear 101, as shown in FIG. 12. The first gear 101 being mounted on a common shaft with the second gear 102 causes the second gear 102 to rotate. The second gear 102 being in engagement with the gear rack 105 mounted to the first curved edge 51 of one of the C-shaped plate members 50 causes the C-shaped plate member 50 to rotate through an arcuate range of motion, thereby causing the carriage assembly 40, i.e. the work platform 53, to form a tilt angle with the workstation support frame 30. The work platform 53 preferably can move between about a −5° to −10° backward tilt angle relative to the workstation support frame 30 to about a 50° to 70° forward tilt angle relative to the workstation support frame 30. FIG. 14 shows the carriage assembly 40 at a tilt angle of about 30°.

To lower the carriage assembly 40 to the lowered position, the operator of the workstation 2 opens the hydraulic or pneumatic valve connected between the hydraulic fluid source or the ambient air, as the case may be, and the cylinder 84 of the piston-cylinder assembly 80. Because the carriage assembly 40 and container 114 together weigh more than the counterweight 64, the restraining force provided by the counterweight 64 is overcome and the fluid in the cylinder 84 is forced out of the cylinder 84 under the action of the downward moving piston rod 82 attached to the bearing plate members 42 of the carriage assembly 40. The carriage assembly 40 thereby moves downwardly under the force of gravity from the raised position shown in FIG. 13 to the lowered position shown in FIGS. 14 and 15. The operator can change the tilt angle of the work platform 53, and hence the container, with the tilt-control assembly 90.

Figure 16:
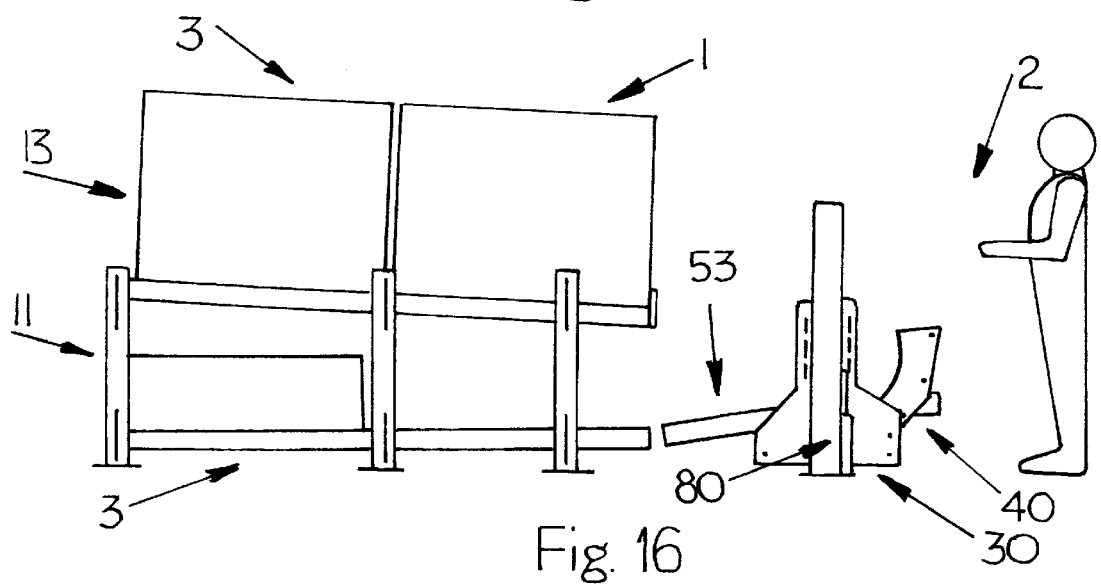
FIG. 16 is a schematic view of the system of FIG. 14 with the carriage assembly in a lowered position and the container moved onto the lower conveyor assembly.
Figure 17:
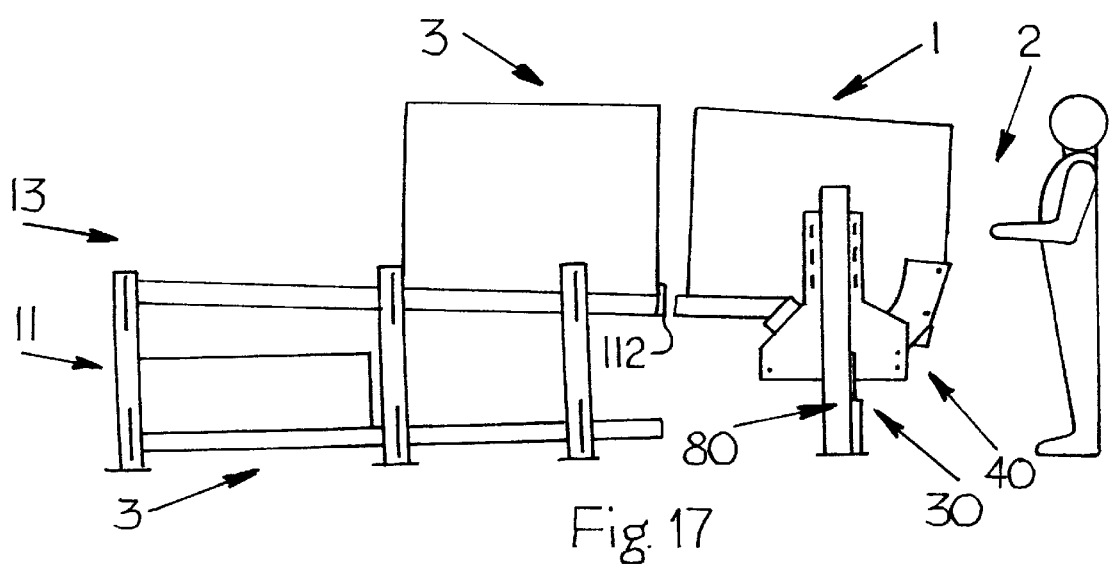
FIG. 17 is a schematic view of the system of FIG. 14 with the next container placed on the raised carriage assembly.

As shown in FIG. 16, the container 114 is collapsible for easy return on the lower rail assembly 11 of the conveyor assembly 3. For example, when the container 114 is empty, the container 114 is collapsed and the carriage assembly 40 tilted rearwardly using the tilt-control assembly 90 to dump the container 114 onto the lower conveyor assembly 11 for removal at the rear end. A conventional stop, similar to the stop 112, may be located at the rear end of the conveyor 11 to prevent the container rolling off the end of the conveyor 11. Once the container 114 is removed from the carriage assembly 40, the carriage assembly 40 again weighs less than the counterweight 64. If the cylinder valve is open, fluid is permitted to flow back into the cylinder by allowing the counterweight 64 to descend within the stanchion 62. The action of the counterweight 64 dropping within the stanchion 62 pulls the carriage assembly 40 upwardly due to the action of the chain 74 connected between the counterweight 64 and the bearing plate member 42. As the carriage assembly 40 begins to move upwardly, the piston rod 82 of the piston-cylinder assembly 80 is also pulled upwardly to its extended position. Hydraulic fluid from the hydraulic fluid source or ambient air will flow into the cylinder 84. The position of the carriage assembly 40 is therefore controlled by opening or closing the valve to the cylinder 84. The carriage assembly 40 will therefore move upwardly to its fully raised position substantially in line with the conveyor assembly 3. When the shutoff valve of the piston-cylinder assembly 80 is placed in the closed position, the workstation 2 is ready to be positioned to receive another container, as shown in FIG. 17.

In summary, the carriage assembly 40 moves from the raised position to the lowered position under the extra weight provided by the container 114 on the carriage assembly 40 with the shutoff valve in the open position. In the preferred embodiment, a typical empty container and the carriage assembly 40 together will weigh enough to overcome the restraining force provided by the counterweight 64. Therefore, the carriage assembly 40 will move from the lowered position to the raised position when the container 114 is removed from the carriage assembly 40. The tilt-control assembly 90 can be used to control the tilt angle of the carriage assembly 40 to fix the carriage assembly 40 at any convenient tilt angle for the operator of the workstation 2.

Figure 18:
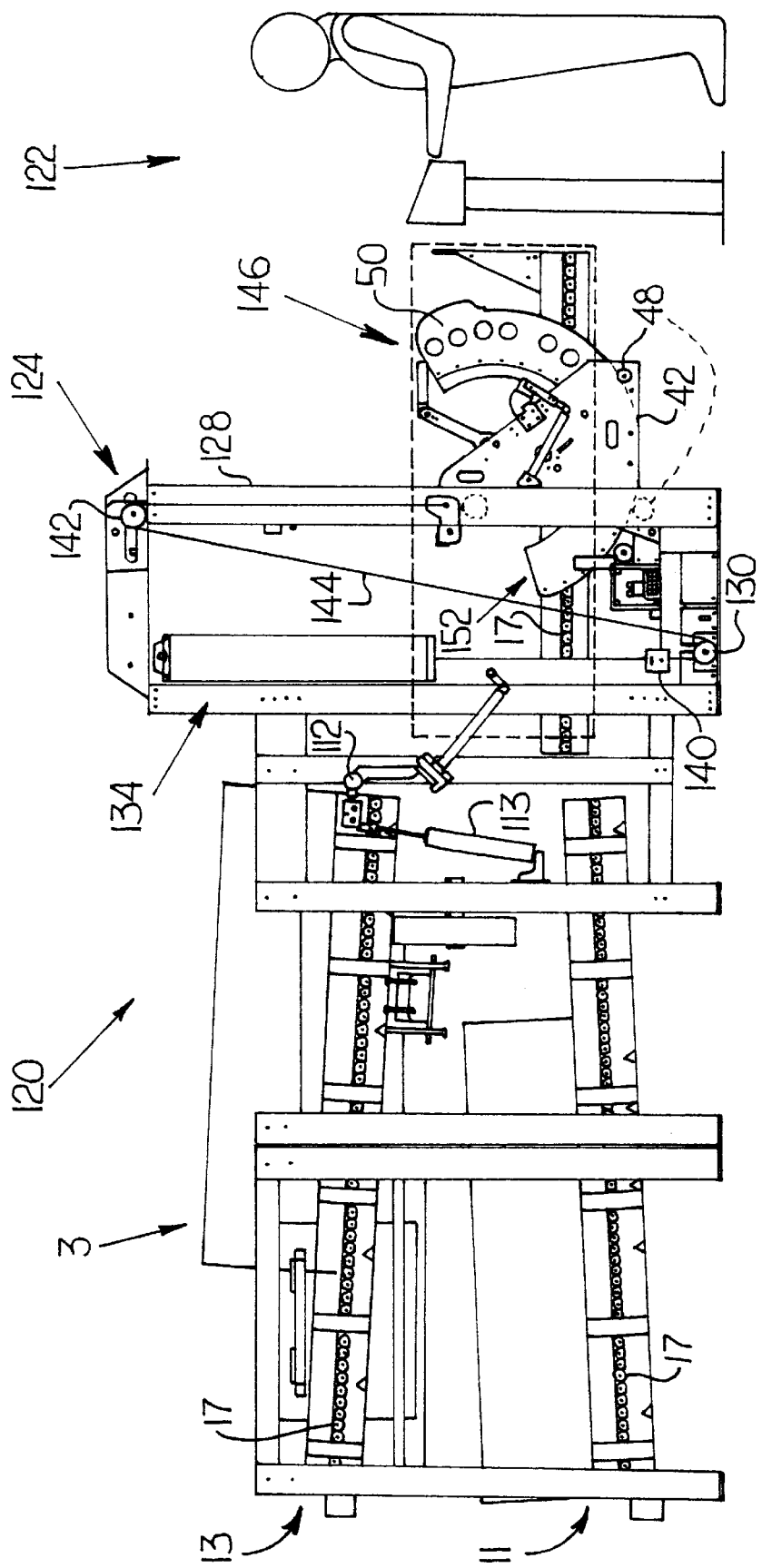
FIG. 18 is a side view of a powered line feed system of the invention.
Figure 19:
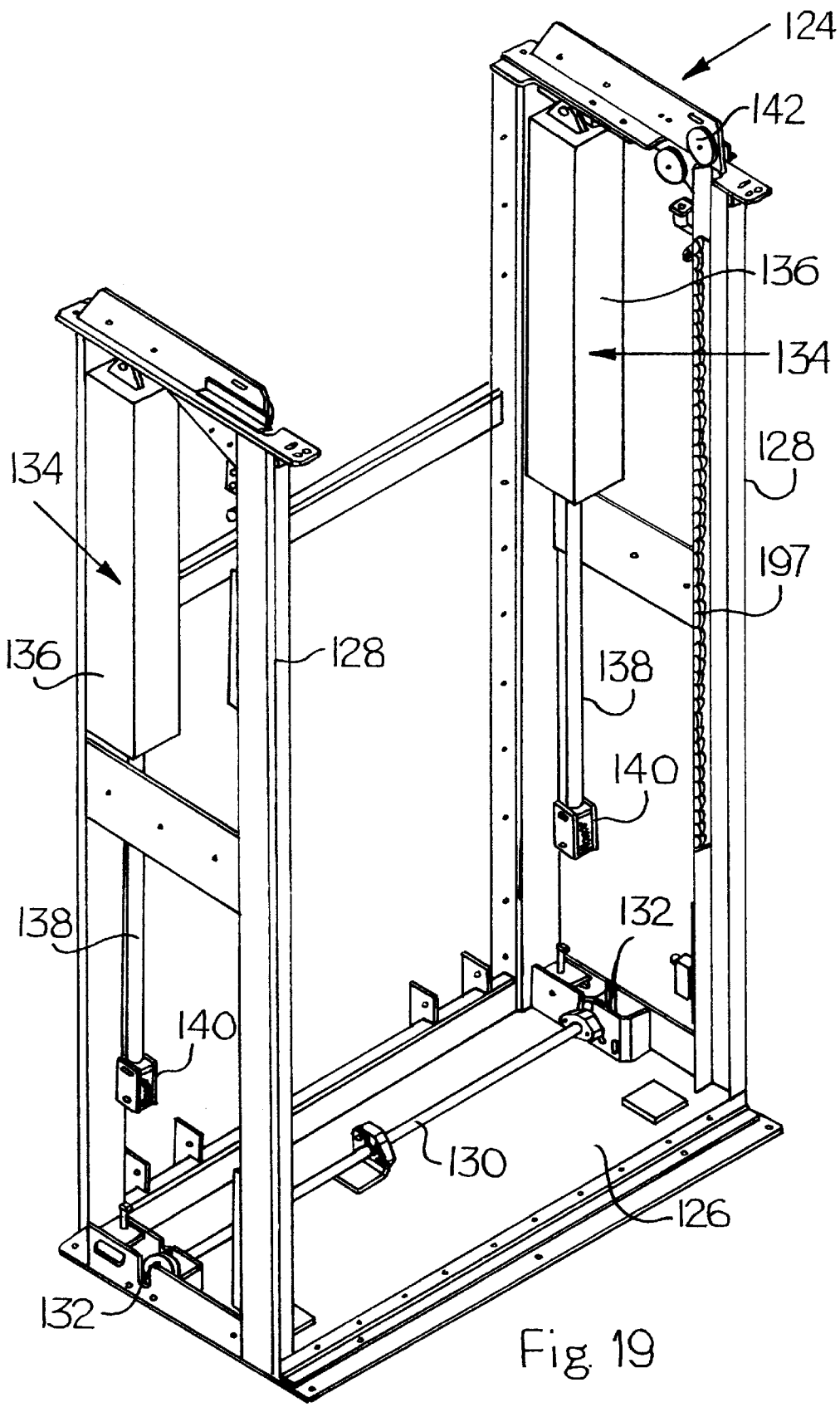
FIG. 19 is a perspective view of a workstation support frame of the system of FIG. 18.

A powered line feed system 120 is shown in FIG. 18. The line feed system 120 includes a conveyor assembly 3 having a lower conveyor assembly 11 and an upper conveyor assembly 13 similar to those described above. However, a workstation 122 of the line feed system 120 is somewhat different from that described above. The workstation 122 includes, as shown in FIGS. 18 and 19, a workstation support frame 124 having a base 126 with four upright stanchions 128. A timing rod 130 is rotatably mounted on the base 126 and includes sprockets 132 attached at each end of the rod 130. A lifting cylinder 134 is mounted on each side of the support frame 124 and includes a cylinder 136 having an extensible piston rod 138, with an attachment member 140 located at the outer end of the piston rod 138. The lifting cylinders 134 may be conventional pneumatic or hydraulic cylinders in flow communication with a source of fluid (not shown) by a conventional valving structure. Upper sprockets 142 are mounted near the top of each side of the support frame 124. As shown in FIG. 18, one end of a flexible member, such as a chain 144, is connected to the attachment member 140 of each piston rod 138. Each chain 144 engages the adjacent sprocket 132 of the timing rod 130 and is threaded over the respective upper sprocket 142. The other end of the chain is connected to a carriage assembly 146, as described hereinbelow.

Figure 20:
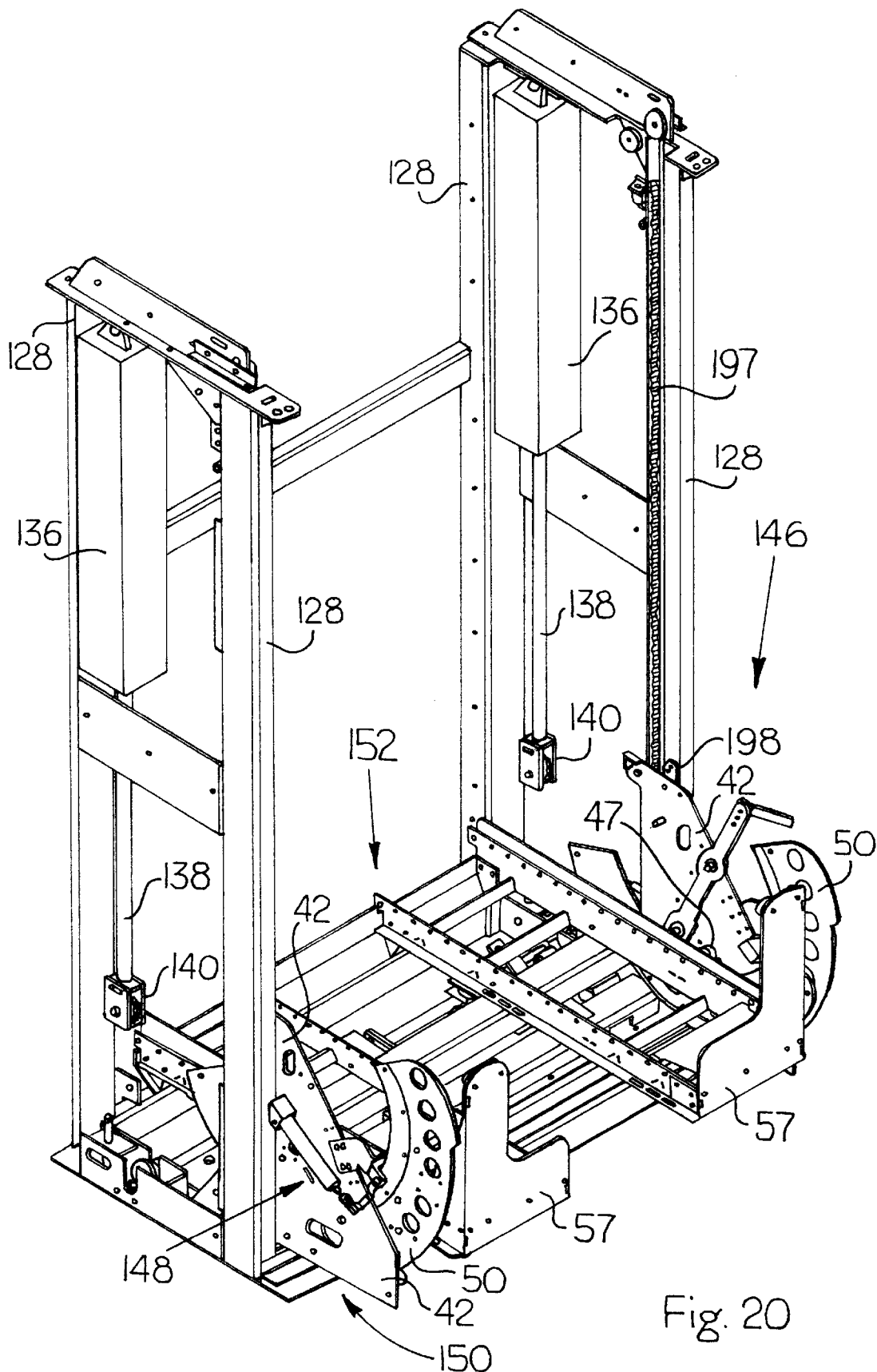
FIG. 20 is the workstation frame of FIG. 19 with a carriage assembly of the invention.
Figure 21:
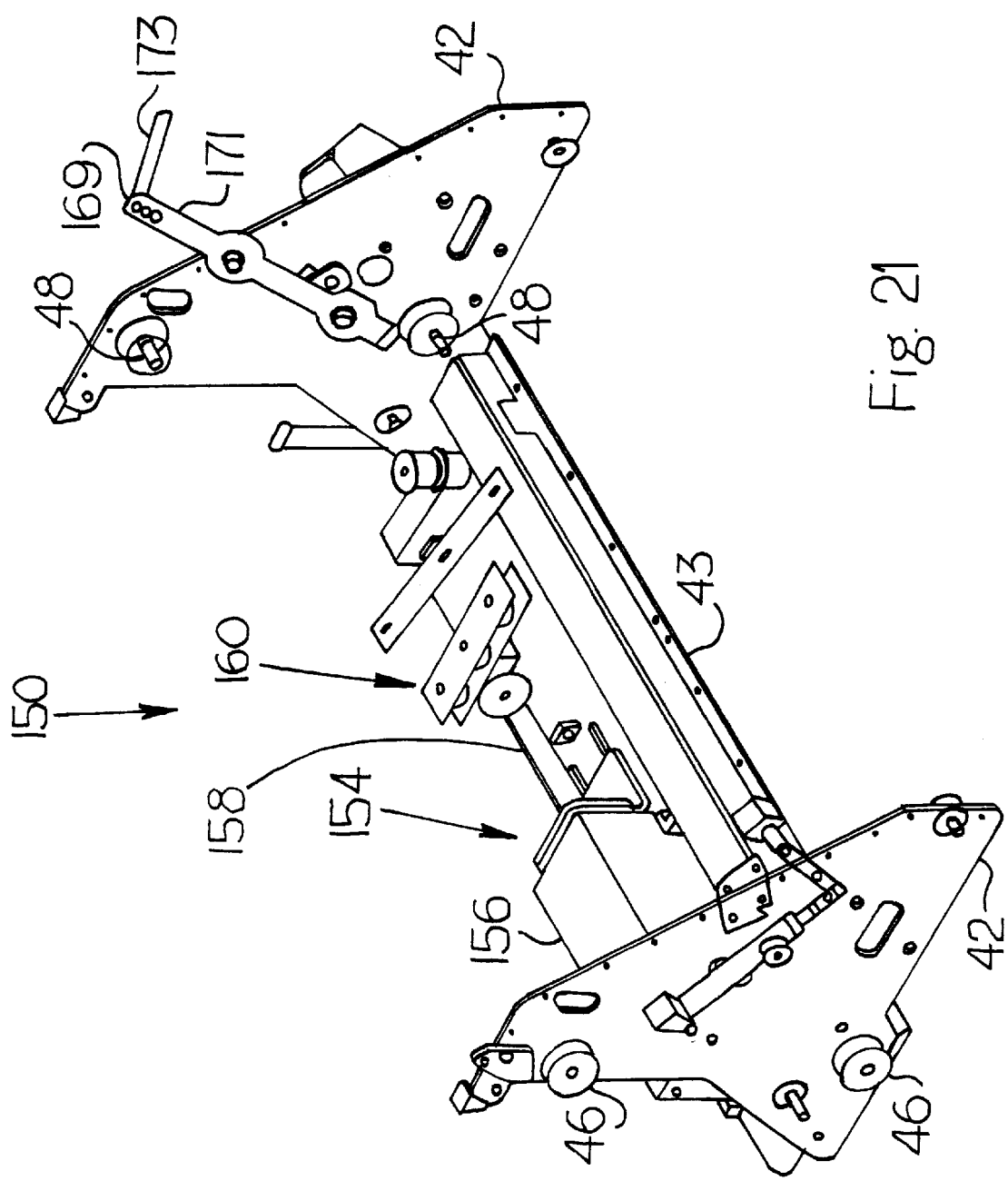
FIG. 21 is a top perspective view of another bearing plate assembly of the invention.
Figure 22:
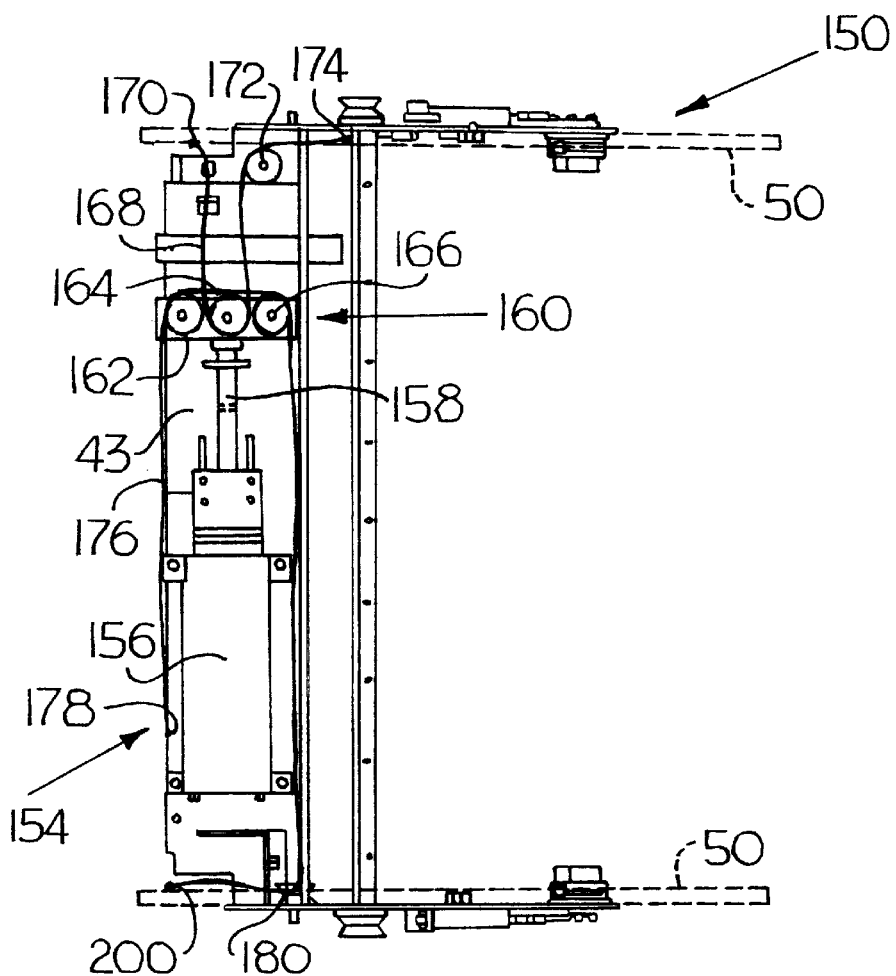
FIG. 22 is a plan view of the bearing plate assembly of FIG. 21.
Figure 23:
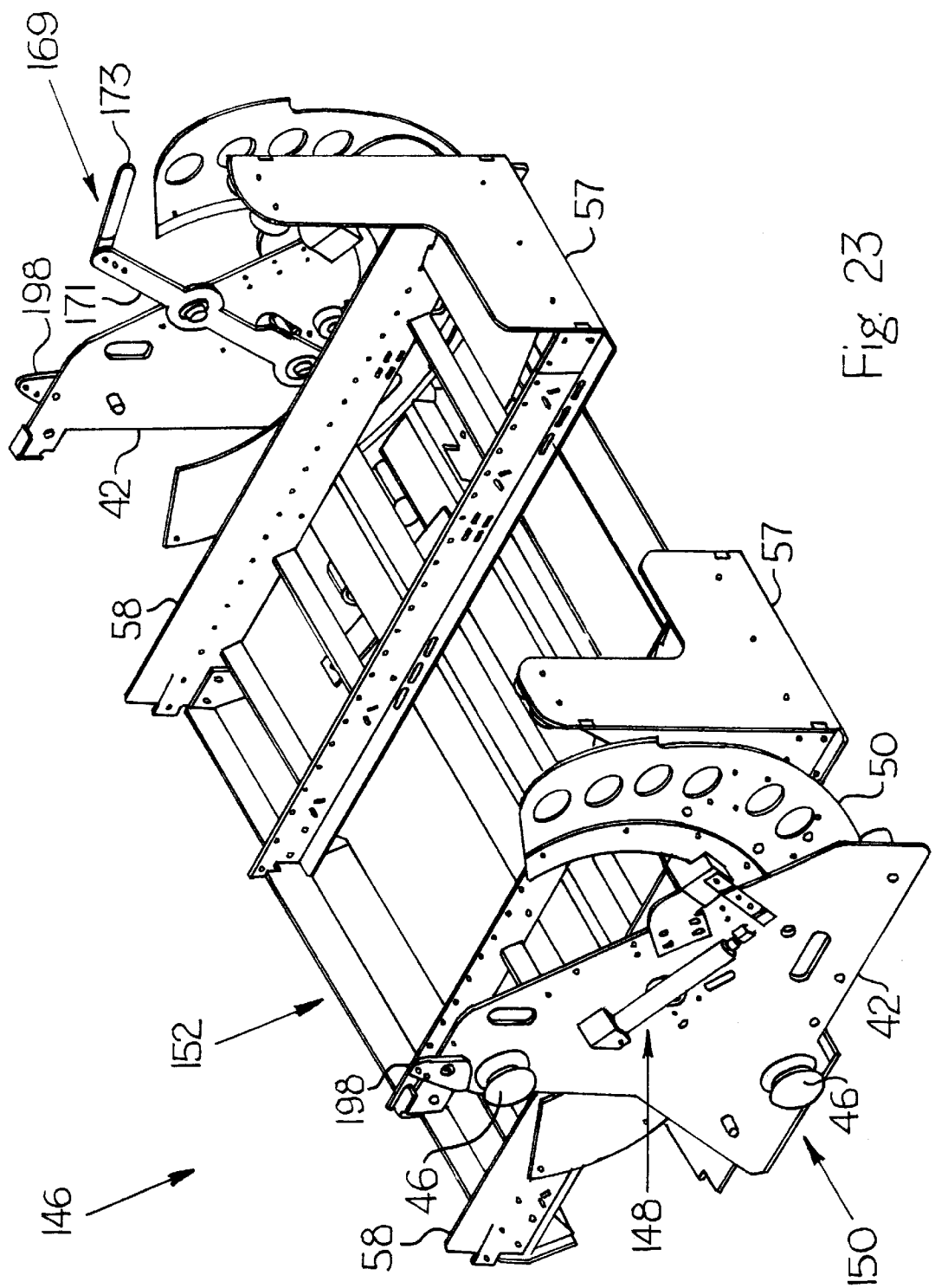
FIG. 23 is a perspective view of the carriage assembly of FIG. 20.

As shown in FIGS. 20 and 23, the carriage assembly 146 is similar to that described above and moves up and down in the support frame 124. However, the carriage assembly 146 includes a work platform brake 148, such as a conventional pneumatic friction brake, which may be used to help set a desired tilt angle of the carriage assembly 146. The carriage assembly 146 includes a bearing plate assembly 150 and a work platform 152 having C-shaped plate members 50 and rollers 17 (not shown) similar to that discussed above. As shown in FIGS. 21 and 22, the bearing plate assembly 150 is similar to that described above but includes a tilting device comprising a tilt cylinder assembly 154.

The support frame 124 may include rows of teeth 197 on each side with a dog 198 pivotally mounted on each bearing plate 50, with the bottom of the dog 198 biased toward engagement with the teeth 197. The chain 144 is preferably attached to the top of the dog 198 to keep the dog bottom out of engagement with the teeth 197 due to the weight of the carriage assembly 146. However, should the chain break, the dog 198 would then pivot to engage the teeth 197 to prevent the carriage assembly 146 from falling.

The tilt cylinder assembly 154 is mounted on the cross member 43 and includes a cylinder 156 having an extensible piston rod 158. A sheave assembly 160 rotatably housing three sheaves 162, 164 and 166 is located on the outer end of the piston rod 158. As shown in FIG. 22, a first cable 168 has one end 170 attached to one of the plate members 50 of the work platform 152. The cable 168 is threaded around the middle sheave 164, around another sheave 172 rotatably mounted on the bearing plate assembly 150 and the other end 174 is attached to a forward part of the plate member 50 forward of the first end 170. Another cable 176 has an end 178 attached to the bearing plate assembly 150. The cable 176 is threaded over the two outer sheaves 162 and 166, around a sheave 180 on the bearing plate assembly 150 and the other end 200 is attached to the other plate member 50, e.g., toward the rear of the plate member 50. The outer sheaves 162 and 166 or their grooves are vertically off-set with respect to the middle sheave 164 to prevent contact between the cables 168 and 176 during operation.

As shown in FIGS. 21 and 23, a mechanical stop 169 may be carried on the carriage assembly 146. The mechanical stop 169 includes a downwardly biased lever 171 movably mounted on one of the bearing plate members 42 and has an inner end which engages a notch on the adjacent plate member 50 at a specific location to mechanically lock the work platform 152 at a desired tilt angle. To move the work platform 152, the lever 171 is disengaged from the notch by pulling upwardly on a handle 173 to release the mechanical stop 169.

Operation of the line feed system 120 will now be described with particular reference to FIG. 18. Containers are placed on the rear of the upper conveyor assembly 13 and roll by gravity to the front of the upper conveyor assembly 13 until the first conveyor contacts the raised stop 112. In this embodiment, the stop 112 may be raised and lowered by a pneumatic cylinder 113 connected to a compressed air source and controlled by the operator in conventional manner. The carriage assembly 146 is raised by the lifting cylinders 134, e.g. the piston rods 138 are drawn into the cylinders 136, pulling upwardly on the chains 144. The timing rod 130 helps maintain an even movement of the carriage assembly 146. The chains 144 pull the carriage assembly 146 upwardly until the work platform 152 is adjacent the front end of the upper conveyor assembly 13. The work platform 152 is tilted to align the rear of the work platform 152 with the front end of the upper conveyor assembly 13 using the tilt cylinder assembly 154. For example, as will be understood from FIGS. 22 and 23, to tilt the work platform 152 forward, the piston rod 158 is retracted into the cylinder 156. This pulls on the first cable 168 causing the left plate member 50, and hence the entire work platform 152, to move to the left. To tilt the work platform 152 rearwardly, the piston rod 158 is extended. When the work platform 152 is at the desired angle, the work platform brake 148 is engaged. The stop 112 is lowered and the forwardmost container rolls onto the work platform 152 and the stop 112 is then raised to prevent other containers moving off of the forward end of the conveyor assembly 13. The lifting cylinders 134 are used to lower the carriage assembly to the lowered position and the work platform 152 is tilted forward using the tilt cylinder assembly 154 to provide easy access for the operator. When the container is empty, the container is collapsed and work platform 152 is tilted rearwardly to cause the container to roll onto the lower conveyor assembly 11 for removal at the rear of the lower conveyor assembly 11. The carriage assembly 146 is then raised to receive another container. The controls for operation of the lifting cylinders 134, tilt cylinder 156, stop 112 and other conveyor systems such as those described below, may be located on a pedestal control board located at the workstation 122.

FIG. 24 shows an additional embodiment of a feed system 182 of the invention. In the embodiments discussed above, the containers are received from the upper conveyor assembly 13 and removed by the lower conveyor assembly 11. However, for heavy or tall containers, this increases the center of gravity of the conveyor system 3 and decreases stability. In the line feed system 182, the conveyor assembly 3 is modified so that the containers are received at the workstation 2 from the lower conveyor assembly 11 and are removed by the upper conveyor assembly 13. A conveyor brake 184, such as a pneumatically actuated brake, may be attached to the lower conveyor assembly 11. The conveyor brake 184 includes a support, such as an elongated member 186, having pads attached thereto. One end of the elongated member 186 is pivotally mounted under the lower conveyor assembly 11 adjacent the bottom of the rollers 17. An actuator 188, such as a pneumatic cylinder or air bag, is attached or configured to contact the free end of the elongated member 186 to pivot the elongated member 186 upwardly to force the pads into contact with the underside of one or more of the rollers 17 on the lower conveyor assembly 11 to prevent them from turning or to make them at least more difficult to turn.

A retarder 190 may be located forward of the conveyor brake 184. The retarder 190 is similar to the brake 184 but instead of a pneumatic activator 188, the pads of the retarder 190 may be set to constantly contact one or more of the rollers 17 to slow down a container rolling along the lower conveyor assembly 11, e.g. the elongated member of the retarder 190 can be held in place by a threaded screw and nut device. In the system 182, the stop 112 is located at the front of the lower conveyor assembly 11.

When a container is loaded onto the rear of the lower conveyor assembly 11, it rolls forward until it contacts the stop 112. More containers may be loaded behind the first container. To place the first, i.e., most forward, container onto carriage assembly 146, the carriage assembly 146 is moved to the lowered position using the lifting cylinders 134 and the work platform 152 is tilted using the tilt cylinder assembly 154 to align the rear of the work platform 152 with the front end of the lower conveyor assembly 11. The conveyor brake 184 is engaged and the stop 112 is lowered. The first container rolls onto the carriage assembly 146 due to the force of gravity. The retarder 190 is used to control the speed at which the container moves along the forward end of the lower conveyor assembly 11. The brake 184 prevents the next container in line from rolling forward. Next, the stop 112 is raised and the brake 184 released, allowing the next container in line to roll up to the stop 112. The container on the carriage assembly 146 can be tilted as described above by the tilt cylinder assembly 154 for easy access by the operator. When the container at the workstation 2 is empty, the container is collapsed and the lift cylinders 134 lift the conveyor assembly 146 to the front of the upper conveyor assembly 13. The work platform 152 is tilted slightly rearwardly to allow the container to roll by gravity onto the upper conveyor assembly 13 for removal.

FIG. 25 shows a further embodiment of a line feed system 192 of the invention. In this system 192, the front end of the lower conveyor assembly 11 is pivotally mounted on the framework 5. An auxiliary lifting device 194, such as an air bag or pneumatic cylinder, is located at or near the rear of the lower conveyor assembly 11. When a container is to be moved onto the carriage assembly 146, the auxiliary lifting device 194 is engaged to raise the rear end of the lower conveyor assembly 11 to cause the container to roll forward onto the carriage assembly 146 by gravity. After use, the empty container is removed via the upper conveyor assembly as described above. The system 192, as well as the gravity system 1, may also include one or more conveyor brakes 184 or retarders 190, if desired.

Figure 26:
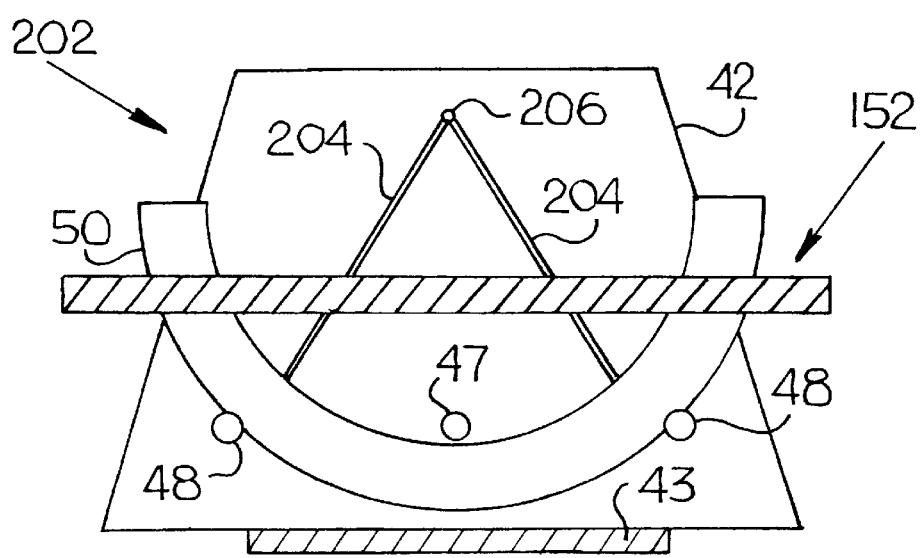
FIG. 26 is a side, schematic view of an alternative method of mounting a work platform of the invention for arcuate movement.

In the carriage assembly 146 shown in FIG. 23, the work platform 152 is arcuately movable on the bearing plate assembly 150 by the curved plate members 50 which ride in the V-shaped rollers 48. However, this structure should not be considered as limiting to the invention. It is to be understood that this arcuate or curved tilting motion of the work platform 152 can be achieved in other ways, such as by roller bearings, etc. For example, an alternative way of achieving the arcuate movement of the work platform 152 is schematically shown in FIG. 26. In this embodiment, the work platform 152 is pivotally mounted to the bearing plate assembly 150 by at least one pivot device 202, preferably a pair of pivot devices 202 with one pivot device 202 connected to each side of the work platform 152, e.g., carried on the spaced plate members 42 of the bearing plate assembly 150. For example, each pivot device 202 may include one or more pivot arms 204 pivotally mounted on a bearing plate member 42 at a pivot point 206. The outer ends of the pivot arms 204 are attached to the work platform 152 such that the work platform 152 is pivotally movable around the pivot points 206. For example, the ends of the pivot arms 204 may be attached to curved plate members 50 attached to the sides of the work platform 152 as described above. The curved plate members 50 may ride in V-shaped rollers 48 in similar manner as described above to help control the movement of the work platform 152 on the bearing plate assembly 150.

With either the mounting method shown in FIG. 23 or that shown in FIG. 26, the work platform 152 is able to arcuately move in the workstation support frame 124 to permit the container to be tilted to an ergonomically efficient angle for easy access by the operator but without unduly invading the operator's work space.

While embodiments of the invention have been described in detail herein, it will be appreciated by those skilled in the art that various modifications and alternatives to the embodiments can be developed in light of the overall teachings of the disclosure. For example, a motor may be provided in place of the crank handle 98 on the gravity system 1 to provide a powered method of adjusting the tilt-angle of the carriage assembly 40 in the gravity system 1. Additionally, it is envisioned that the entire operation discussed hereinabove may be fully automated and remotely controlled. It is also envisioned that the tilting feature of the carriage assembly can be powered by a motor, such as an electric gear motor, or other similar devices, such as threaded rods, gear assemblies, etc. Also the lifting cylinders 134 described above can be replaced by other devices, such as electric motors and gear trains, threaded rods, screw drives, etc., to move the carriage assembly. Accordingly, the particular arrangements are illustrative only and are not limiting as to the scope of the invention, which is to be given the full breadth of the appended claims and any and all equivalents thereof.

What is claimed is:

1. A line feed system, comprising:
 a conveyor assembly having an end, the conveyor assembly including a first gravity conveyor located below a second gravity conveyor; and
 a workstation located adjacent the end of the conveyor assembly, the workstation comprising:
  a support frame;
  a carriage assembly movably mounted in the support frame, the carriage assembly including a bearing plate assembly with a work platform mounted for arcuate movement on the bearing plate assembly;
  a lifting device attached to the carriage assembly to selectively move the carriage assembly on the support frame; and
  a tilting device connected to the work platform and configured to move the work platform with respect to the bearing plate assembly,
  wherein the bearing plate assembly includes two opposed bearing plates, with each bearing plate having at least one roller, and wherein the work platform includes two opposed, curved members and wherein the curved members are movable along the rollers to tilt the work platform.

2. A line feed system, comprising:
 a conveyor assembly having an end, the conveyor assembly including a first gravity conveyor located below a second gravity conveyor; and
 a workstation located adjacent the end of the conveyor assembly, the workstation comprising:
  a support frame;
  a carriage assembly movably mounted in the support frame, the carriage assembly including a bearing plate assembly with a work platform mounted for arcuate movement on the bearing plate assembly;
  a lifting device attached to the carriage assembly to selectively move the carriage assembly on the support frame; and
  a tilting device connected to the work platform and configured to move the work platform with respect to the bearing plate assembly,
 wherein the bearing plate assembly includes two opposed bearing plates, with at least one pivot arm pivotally mounted on each bearing plate at a pivot point and with each pivot arm attached to the work platform such that the work platform is pivotal about the pivot points.

3. A line feed system, comprising:
 a conveyor assembly having an end; and
 a workstation located adjacent the end of the conveyor assembly, the workstation including:
  a support frame;
  a carriage assembly movably mounted in the support frame, the carriage assembly including a work platform tiltably mounted on the carriage assembly;
  at least one lifting device connected to the carriage assembly to move the carriage assembly in the support frame; and a tilting device connected to the work platform to selectively tilt the work platform,
wherein the lifting device includes a counterweight assembly having a counterweight connected to the carriage assembly and configured to bias the carriage assembly toward a top of the support frame.

4. The system as claimed in claim 3, wherein a weight of the counterweight is about 110% of a weight of the carriage assembly.

5. The system as claimed in claim 3, wherein the counterweight assembly includes a chain with one end of the chain connected to the counterweight and the other end of the chain attached to the carriage assembly.

6. A line feed system comprising:
a conveyor assembly having an end; and
a workstation located adjacent the end of the conveyor assembly, the workstation including:
a support frame;
a carriage assembly movably mounted in the support frame, the carriage assembly including a work platform tiltably mounted on the carriage assembly;
at least one lifting device connected to the carriage assembly to move the carriage assembly in the support frame; and
a tilting device connected to the work platform to selectively tilt the work platform,
wherein the lifting device includes at least one lifting cylinder connected to the carriage assembly,
wherein the at least one lifting cylinder is connected to the carriage assembly by a chain.

7. A line feed system, comprising:
a conveyor assembly having an end; and
a workstation located adjacent the end of the conveyor assembly, the workstation including:
a support frame;
a carriage assembly movably mounted in the support frame, the carriage assembly including a work platform tiltably mounted on the carriage assembly;
at least one lifting device connected to the carriage assembly to move the carriage assembly in the support frame; and
a tilting device connected to the work platform to selectively tilt the work platform,
wherein the tilting device includes a piston-cylinder assembly with a sheave assembly mounted at one end of the piston.

8. The system as claimed in claim 7, wherein the sheave assembly includes at least one sheave with a first flexible member carried on the at least one sheave and with at least one end of the first flexible member attached to the work platform such that movement of the piston causes movement of the work platform.

9. The system as claimed in claim 7, wherein the sheave assembly includes a first sheave, a second sheave and a third sheave, with a first flexible member engaging the second sheave and with each end of the first flexible member attached to a curved plate member of the work platform.

10. The system as claimed in claim 9, including a second flexible member engaging the first and third sheaves, with one end of the second flexible member attached to the work platform and the other end of the second flexible member attached to a bearing plate assembly supporting the work platform.

11. A line feed system, comprising:
a conveyor assembly having an end; and
a workstation located adjacent the end of the conveyor assembly, the workstation including:
a support frame;
a carriage assembly movably mounted in the support frame, the carriage assembly including a work platform tiltably mounted on the carriage assembly;
at least one lifting device connected to the carriage assembly to move the carriage assembly in the support frame; and
a tilting device connected to the work platform to selectively tilt the work platform,
wherein the carriage assembly includes a bearing plate assembly, with the work platform mounted for arcuate movement on the bearing plate assembly, and
wherein the bearing plate assembly includes at least one roller and the work platform includes at least one curved member, with the curved member movable on the roller to tilt the work platform.

12. The system as claimed in claim 11, including a piston-cylinder assembly attached to the carriage assembly to selectively hold the carriage assembly at a selected position on the support frame.

13. The system as claimed in claim 11, wherein the lifting device includes at least one lifting cylinder connected to the carriage assembly.

14. The system as claimed in claim 11, wherein the conveyor assembly includes a first conveyor and a second conveyor, with each conveyor including rollers and with the second conveyor located above the first conveyor.

15. The system as claimed in claim 14, including a conveyor brake located on at least one of the conveyors, the conveyor brake including a support pivotally mounted below the at least one conveyor and configured to move from a first position in which the conveyor brake does not contact the rollers of the at least one conveyor to a second position in which the conveyor brake contacts at least one of the rollers of the at least one conveyor.

16. The system as claimed in claim 11, wherein the conveyor assembly includes at least one gravity conveyor.

17. The system as claimed in claim 11, wherein the work platform is tiltable between about −10° to about +70° with respect to the work station support frame.

18. The system as claimed in claim 16, wherein the at least one gravity conveyor is pivotally mounted on the conveyor assembly and the system includes an auxiliary lifting device configured to pivot the at least one gravity conveyor from a first position to a second position.

19. The system as claimed in claim 11, wherein the bearing plate assembly includes two opposed bearing plates, with each bearing plate having at least one roller, wherein the work platform includes two opposed curved members, and wherein the curved members are movable along the rollers to tilt the work platform.

20. A line feed system, comprising:
a conveyor assembly having an end; and
a workstation located adjacent the end of the conveyor assembly, the workstation including:
a support frame;
a carriage assembly movably mounted in the support frame, the carriage assembly including a work platform tiltably mounted on the carriage assembly;
at least one lifting device connected to the carriage assembly to move the carriage assembly in the support frame; and
a tilting device connected to the work platform to selectively tilt the work platform,
wherein the lifting device includes at least one lifting cylinder connected to the carriage assembly, and
wherein the lifting device includes a lifting cylinder located at opposed sides of the support frame, with each lifting cylinder connected to an end of a timing rod rotatably mounted in the support frame.

21. A line feed system, comprising:

a conveyor assembly having an end; and a workstation located adjacent the end of the conveyor assembly, the workstation including:
   a support frame;
   a carriage assembly movably mounted in the support frame, the carriage assembly including a work platform tiltably mounted on the carriage assembly;
   least one lifting device connected to the carriage assembly to move the carriage assembly in the support frame; and
   a tilting device connected to the work platform to selectively tilt the work platform,
   wherein the carriage assembly includes a bearing plate assembly, with the work platform mounted for arcuate movement on the bearing plate assembly, and
   wherein the bearing plate assembly includes at least one pivot arm pivotally mounted on the bearing pate assembly at a pivot point, with an outer and of the pivot arm connected to the work platform such that the work platform is pivotable around the pivot point.

22. The system as claimed in claim 21, wherein the bearing plate assembly includes two opposed bearing plates, with at least one pivot arm pivotally mounted on each bearing plate, and with an outer end of each pivot arm attached to the work platform.

* * * * *

UNITED STATES PATENT AND TRADEMARK OFFICE
CERTIFICATE OF CORRECTION

PATENT NO. : 6,269,938 B1  Page 1 of 1
DATED : August 7, 2001
INVENTOR(S) : David W. Lutz It is certified that error appears in the above-identified patent and that said Letters Patent is hereby corrected as shown below:

Title page,
Item [57], ABSTRACT, add at the end:
-- In one embodiment, the lifting device includes a counterweight assembly positioned adjacent the workstation support frame. The counterweight assembly provides a restraining force to maintain the carriage assembly in a raised position when a container is not positioned on the carriage assembly. A piston-cylinder assembly may be preferably connected between the workstation support frame and the carriage assembly. The piston-cylinder assembly may be connected to an incompressible fluid source by a shutoff valve. In a powered embodiment, the counterweight assembly can be replaced by a conventional lifting assembly, such as an electric motor, hydraulic or pneumatic cylinder, air bag, ball screw, etc. --

Column 4,
Line 39, "include" should read -- includes --.

Column 5,
Line 35, "received" should read -- reeved --.

Column 15, claim 21,
Line 11, before "least one" insert -- at --.

Column 16, claim 21,
Line 5, "bearing pate" should read -- bearing plate --.
Line 6, "outer and" should read -- outer end --.

Signed and Sealed this

Ninth Day of April, 2002

*Attest:*

JAMES E. ROGAN
*Attesting Officer*     *Director of the United States Patent and Trademark Office*